Nov. 27, 1928.
P. T. STOUGHTON
1,693,097
VEHICLE SPRING CONTROL
Filed Nov. 1, 1927　　2 Sheets-Sheet 1
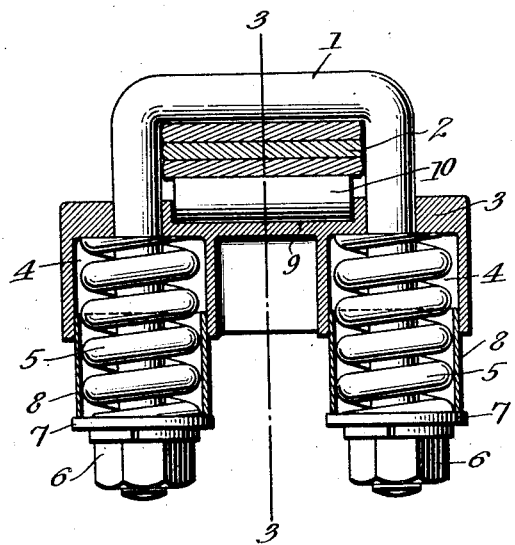
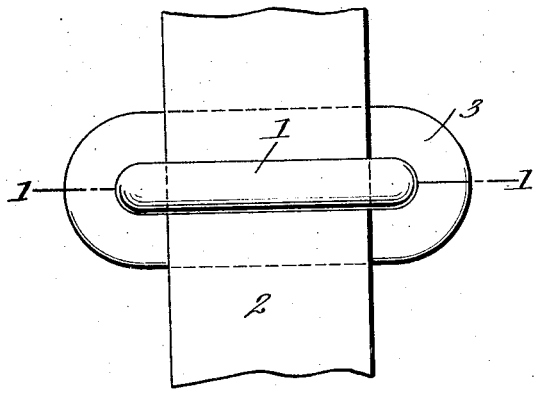
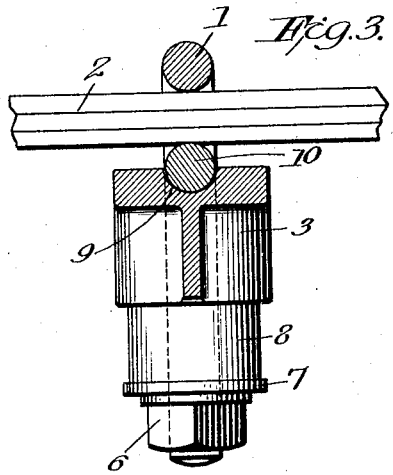
Inventor
Peter Thomas Stoughton
By Cushman, Bryant Darby
Attorneys Nov. 27, 1928.  1,693,097
P. T. STOUGHTON
VEHICLE SPRING CONTROL
Filed Nov. 1, 1927   2 Sheets-Sheet 2

Inventor
Peter Thomas Stoughton
Attorneys

Patented Nov. 27, 1928.

1,693,097

UNITED STATES PATENT OFFICE.

PETER THOMAS STOUGHTON, OF PORTLAND, MAINE.

VEHICLE SPRING CONTROL.

Application filed November 1, 1927. Serial No. 230,310.

The invention relates to the control of spring action for vehicles.

Great discomfort has been experienced in spring supported vehicles when encountering sudden jolts caused by uneven road surfaces.

The tendency of the vehicle body is to bound from the chassis, and then recoil with terrific force, followed by subsequent jerking movements and recoils until once again the body returns to its normal position.

This is due to the unrestricted action of the vehicle springs, the leaves of which, although in frictional engagement, do not exert sufficient restraining pressure upon each other to avoid the shock of rebound.

Heretofore devices have been used, such as shock absorbers and snubbers, between the body and the chassis to eliminate this propensity, but their expense is considerable and the construction is complicated.

It is the object of this invention to provide a spring control which has a positive action at all times upon the movement of the vehicle springs, which is of simple construction, and which can be quickly and readily installed.

It is also an object of this invention to reduce the necessity of adjustment to a negligible degree after the appliance has once been attached to the vehicle spring.

Another object of this invention is to provide a device of the character described, which, while highly efficient, may be manufactured at a comparatively small cost, and, therefore, within the purchasing power of the automobile populace.

Still another object of the invention is to provide means for rendering vehicle springs noiseless, in that the action of the device prevents rattling which is apt to be the case, especially when the vehicle springs become old and worn.

In order that the invention may be clear to those skilled in the art, I have shown in the accompanying drawings, embodiments of my invention.

In the drawings:

Figure 1 is a view in elevation with the tube-like sleeves surrounding the resilient members and other parts in section.

Figure 2 is a top plan view of the device of Figure 1.

Figure 3 is a side view of the device of Figure 1.

Figure 4:
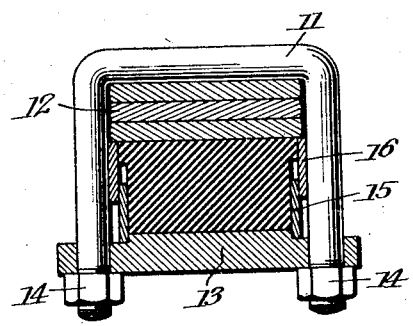
Figure 4 is a front view of a slightly modified form.

Referring to the drawings by numerals, like parts indicating like numbers, and first to the preferred form, in Figures 1, 2 and 3, the yoke 1 is held in position adjacent the vehicle springs 2 by means of the slidable bar 3. The bar 3 contains two recesses 4, through which the ends of the yoke 1 extend. Within these recesses, and around the yoke ends, are resilient members, here shown as coiled springs 5. The nuts 6 on either yoke end regulate the tension adjustment of the coiled springs 5. Resting upon washers 7, and enclosing the lower ends of the coiled springs, are tubular members 8, which slide within the recesses 4 of the bar 3, and indentation 9 extends longitudinally of the bar 3 on its side adjacent the vehicle springs, wherein is loosely positioned a roller 10, which is in constant and positive contact with the vehicle springs. This feature is particularly well illustrated in Figure 3.

By virtue of the arrangement of parts described, the action of the movement of the vehicle springs is at all times of a positive nature. Adjustment of the necessary tension of the coiled springs to accomplish the desired result is made by means of the nuts 6. When once efficiently set, no further adjustment need be made, except to take up any possible wear.

The tubular recesses of the bar in conjunction with the tubular members which fit therein, provide an enclosed chamber in which lubricating ingredients may be placed, and at the same time, prevent the entrance of water and foreign matter.

The roller 10 allows free action of the vehicle springs to the degree of tension applied, and eliminates any propensity the device may have for shifting on the vehicle springs when in action.

I do not wish to limit this form of the invention to the use of coiled springs, as any resilient means, such as rubber, will prove efficient.

In the form shown in Figure 4 the yoke 11 is held in position around the vehicle springs 12 by the bar 13, and the nuts 14, the latter element forming the means of adjustment.

Between the vehicle springs 12 and the bar 13 is placed a resilient element, here shown as rubber or the like, enclosed by the telescopic tubes 15 and 16. These tubes prevent undue side expansion or distortion of the resilient member, as well as preventing water and foreign matter from coming in contact with the resilient means.

Figure 6:
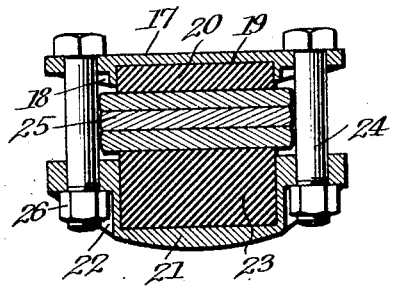
Figure 6 is a front view of another slightly modified form.
Figure 5:
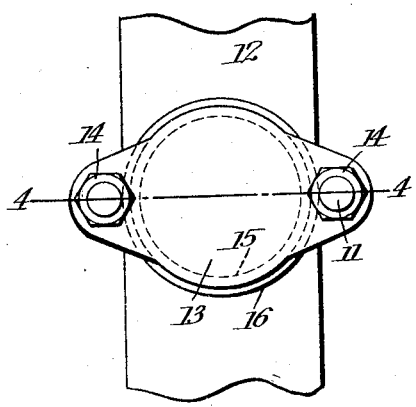
Figure 5 is a bottom view of the form in Figure 4.
Figure 7:
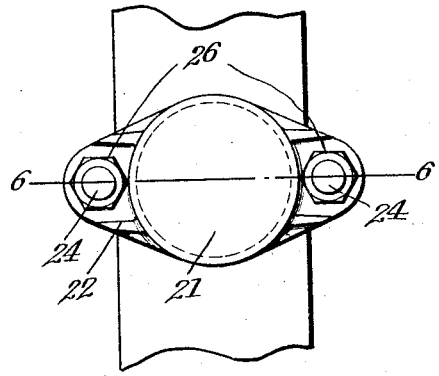
Figure 7 is a bottom view of the device of Figure 6.

In Figure 6, another form is illustrated, comprising a bar 17 having a web 18, containing a shallow circular recess 19 to receive the resilient member 20, such as rubber or the like, and a bar 21 having a web 22, containing a deep circular recess to receive a resilient member 23. Bolts 24 pass through the two bars, which are held in adjustable position about the vehicle springs 25 by the nuts 26.

In applying the various forms of my invention, the spring control may be placed where found most effective, either as shown in the drawings or in reverse position, with the adjusting nuts above the vehicle spring, although the positioning of the device, as shown in Figure 1, has the advantage of preventing ready entrance of water to the recesses and parts therein.

With a device constructed as described and illustrated, rebound of the springs is effectively checked. When installed and tensioned to the desired degree the resilient character of the device will permit proper functioning of the springs under normal stresses, but will grip and hold the springs from violent and sudden recoils under abnormal strains. Furthermore, it has the function of a spring clip to hold the leaves of the springs always in proper relation and alignment.

I do not wish to limit myself to any particular form of the invention and any variations not a departure from the spirit of the invention which is to be regarded as within the scope of the following claims.

I claim:—

1. A vehicle spring control comprising a yoke, a bar through which the yoke ends protrude, coiled springs surrounding the yoke ends, nuts screw threaded on the yoke ends for adjusting the pressure of the coiled springs, recesses in the bar for receiving the coiled springs, enclosing members surrounding the coiled springs and adapted to slide telescopically within the cylindrical recesses in the bar, and anti-friction means between said bar and the vehicle springs.

2. A vehicle spring control comprising a yoke, a bar through which the yoke ends protrude, coiled springs surrounding the yoke ends, nuts screw threaded on the yoke ends for adjusting the pressure of the coiled springs, cylindrical recesses in the bar for receiving the coiled springs, cylindrical enclosing members surrounding the coiled springs and adapted to slide telescopically within the cylindrical recesses in the bar, and a roller between said bar and the vehicle springs.

3. A vehicle spring control comprising a yoke, a bar through which the yoke ends protrude, coiled springs surrounding the yoke ends, nuts screw threaded on the yoke ends for adjusting the pressure of the coiled springs, cylindrical recesses in the bar for receiving the coiled springs, cylindrical enclosing members surrounding the coiled springs and adapted to slide telescopically within the cylindrical recesses in the bar, and a roller loosely resting in a longitudinal recess in the side of the bar adjacent the vehicle spring.

In testimony whereof I have hereunto set my hand.

PETER THOMAS STOUGHTON.